United States Patent
Zhao et al.

(10) Patent No.: US 11,465,595 B2
(45) Date of Patent: Oct. 11, 2022

(54) AUTOMOTIVE IMAGE SENSOR SURFACE WASHING AND DRYING SYSTEM AND METHOD

(71) Applicant: DLHBOWLES, INC., Canton, OH (US)

(72) Inventors: Chunling Zhao, Ellicott City, MD (US); Shridhar Gopalan, Westminster, MD (US)

(73) Assignee: DLHBOWLES, INC., Canton, OH (US)

( * ) Notice: Subject to any disclaimer, the term of this patent is extended or adjusted under 35 U.S.C. 154(b) by 615 days.

(21) Appl. No.: 16/234,748

(22) Filed: Dec. 28, 2018

(65) Prior Publication Data

US 2019/0202411 A1 Jul. 4, 2019

Related U.S. Application Data

(60) Provisional application No. 62/612,362, filed on Dec. 30, 2017.

(51) Int. Cl.
*B60S 1/56* (2006.01)
*G02B 27/00* (2006.01)
*B05B 1/00* (2006.01)
*B05B 1/04* (2006.01)
*B08B 5/02* (2006.01)
*B60S 1/52* (2006.01)
*B60S 1/54* (2006.01)

(52) U.S. Cl.
CPC .............. *B60S 1/56* (2013.01); *B05B 1/005* (2013.01); *B05B 1/044* (2013.01); *B08B 5/02* (2013.01); *B60S 1/52* (2013.01); *B60S 1/54* (2013.01); *G02B 27/0006* (2013.01)

(58) Field of Classification Search
None
See application file for complete search history.

(56) References Cited

U.S. PATENT DOCUMENTS

| 5,550,677 | A | 8/1996 | Schofield et al. |
| 5,670,935 | A | 9/1997 | Schofield et al. |
| 5,796,094 | A | 8/1998 | Schofield et al. |
| 6,097,023 | A | 8/2000 | Schofield et al. |
| 6,201,642 | B1 | 3/2001 | Bos |
| 6,690,268 | B2 | 2/2004 | Schofield et al. |
| 6,717,610 | B1 | 4/2004 | Bos et al. |
| 7,965,336 | B2 | 6/2011 | Bingle et al. |

(Continued)

FOREIGN PATENT DOCUMENTS

| DE | 10016221 | 10/2001 |
| EP | 3168094 | 5/2017 |

OTHER PUBLICATIONS

International Searching Authority, European Patent Office, International Search Report and Written Opinion for PCT/US2018/067789, dated May 10, 2019.

*Primary Examiner* — Natasha N Campbell
*Assistant Examiner* — Pradhuman Parihar
(74) *Attorney, Agent, or Firm* — McDonald Hopkins LLC

(57) ABSTRACT

The present disclosure relates to automated or remotely controlled methods and apparatuses for cleaning and drying soiled external 2-D or 3-D image sensor surfaces such as objective lenses on Light Detection and Ranging ("LIDAR") sensors when mounted in a configuration that is exposed to dirty environments.

16 Claims, 13 Drawing Sheets

(56) References Cited

U.S. PATENT DOCUMENTS

| | | | |
|---|---|---|---|
| 9,278,670 B2 | 3/2016 | Hattori | |
| 9,831,630 B2 | 11/2017 | Lipson | |
| 9,834,209 B2 | 12/2017 | Stettner et al. | |
| 9,992,388 B2 | 6/2018 | Romack | |
| 2014/0299672 A1* | 10/2014 | Gopalan | B05B 1/005 |
| | | | 239/11 |
| 2017/0036647 A1 | 2/2017 | Zhao | |
| 2017/0274396 A1* | 9/2017 | Wang | F04F 5/46 |

\* cited by examiner

AUTOMOTIVE IMAGE SENSOR SURFACE WASHING AND DRYING SYSTEM AND METHOD

CROSS-REFERENCE TO RELATED APPLICATIONS

This application claims priority to and benefit of U.S. Provisional Application No. 62/612,362 entitled "Automotive Image Sensor Surface Washing and Drying system including a Large Coverage Drying Air Nozzle Assembly adapted for use with 2-D image sensors and 3-D image systems such as LIDAR systems on vehicles and Method for Making and Aiming Washing and Drying Nozzles," filed on Dec. 30, 2017, which is hereby incorporated by reference in its entirety. This application is also related to the following commonly owned patent applications on sensor objective lens surface wash systems and methods: U.S. Provisional Application No. 61/451,492 filed Mar. 10, 2011, PCT Application No. PCT/US12/28828 filed Mar. 12, 2012, U.S. application Ser. No. 14/086,746, filed Nov. 21, 2013, U.S. Provisional Application No. 61/978,775, filed Apr. 11, 2014, and U.S. application Ser. No. 15/304,428, published as U.S. Pub. No. 2017/0036647, the entire disclosures of which are incorporated herein by reference.

FIELD OF THE DISCLOSURE

The present disclosure relates to automated or remotely controlled methods and apparatus for cleaning and drying soiled external image sensor surfaces such as objective lenses on Light Detection and Ranging ("LIDAR") sensors when mounted in a configuration that is exposed to dirty environments.

BACKGROUND

External view (e.g., front bumper, side-view, rear-view or back-up) 2-D imaging systems have been added to recreational vehicles and automobiles to enhance the driver's vision and to improve safety. FIGS. 1A and 1B illustrate an example of a vehicle with a back-up camera system (disclosed in U.S. Pat. No. 7,965,336, to Bingle et al). Such camera systems have external objective lens surfaces which accumulate road grime and so require cleaning, as noted in applicant's prior work (see, e.g., U.S. Published Application 2017/0036647 entitled Integrated Multi Image Sensor and Lens Washing Nozzle Assembly and Method for Simultaneously Cleaning a Plurality of Image Sensors). As illustrated in FIG. 1C, for example, an existing windshield washing system 202 (a "front wash") or rear window washing system 200 ("rear wash") require use of a washing fluid reservoir and pumping system to provide a supply of pressurized washing fluid. A washer tank or reservoir 206 typically includes an internal pump 208 which is activated to draw washing fluid from the reservoir to supply pressurized fluid to a conduit network 210 (e.g., comprising lumens, tubes or hoses) which supply the windshield washing nozzles 212 and rear window washing nozzle(s) 214 from a lens washing nozzle assembly 100.

While applicant's external camera lens washers have provided much improved lens cleaning, sometimes washer fluid droplets remain within the image sensor's field of view. Automotive designers have been directing significant development efforts to vehicles which can either drive themselves or use imaging sensors to enhance safety of driver operated vehicles by detecting and avoiding collisions with objects in the vehicles path. Modern safety systems can include collision avoidance systems or adaptive cruise control which rely on 3-D image generation and object detection systems. 3-D image generation and the identification of objects, tracking of objects, road hazard avoidance, and collision avoidance in short range automotive applications can include 3-D (e.g., LiDAR) sensor assemblies having a laser transmitters, laser sensors and digital processors integrated in a housing mounted on a vehicle's body panel. There are examples of 3-D (e.g., LIDAR) sensor assemblies adapted for semi-autonomous or fully autonomous vehicles (see, e.g., U.S. Pat. No. 9,831,630 to Lipson or U.S. Pat. No. 9,834,209 to Stettner et al) and they also carry external cover surfaces or objective lens surfaces which are prone to becoming soiled. For example, as shown in FIGS. 1D, 1E, 1F, and 1G a LIDAR sensor 10 is readily configured for use in an array 30 in a system 80 and each sensor system includes laser emitters and reflected laser energy receivers which operate through lenses 94, 110.

Camera wash nozzles such as applicant's own may be configured to spray washer fluid to remove dirt or other adherence from the 3-D image sensor (e.g., LIDAR) lens surface, but if washer fluid droplets remain on the external lens surfaces, the emitted or reflected laser energy is disrupted and the sensor is rendered less effective. So some method or apparatus is needed to remove fluid droplets from or dry the external lens surfaces. Typical prior art air nozzles used for drying washer fluid drops from a lens surface are configured as jet or shear nozzles, but both have the limitation of excessively narrow coverage. Any drying system must also have a source for air and there is always a demand in vehicle design for less weight, less space and less cost, so any system with excessive demands for air flow rate, large expensive compressors or multiple nozzles will be unsuitable for use on a modern automobile (e.g., 46 as seen in FIG. 1F). If several sensors are used, as shown in FIG. 1F, then the air needed to dry the external sensor surfaces becomes a significant problem. If significant air is needed, then air flow must be generated from an on-board blower of some kind or a system with on-vehicle storage of compressed air. Most passenger vehicles do not have compressed air systems. Adding a compressed air system, which comprises a compressor and typically an accumulator, is expensive and troublesome for several reasons, including added cost to vehicle, packaging space, and complexity.

Air dryer nozzles typically require a significant air flow rate (e.g., 30 LPM). The air exiting into the ambient space near the sensor surface is rapidly diffused. Additionally, the mass of the air stream has to be large enough to overcome the mass of the remaining washer fluid droplets without requiring multiple blow actions. Requiring large amounts of air is especially awkward in newer high performance vehicles which have many sensors that need cleaning and drying (e.g., as many as 30 to 40 sensors). In applications such as the system shown in FIG. 1F, the amount of air needed is staggering. The available sources for that air (e.g., 12 to 40V on-board compressors) can only supply so much air, and using the systems of the prior art, not enough at the required pressure and flow rates.

If the washer or dryer are located within the 2-D or 3-D image sensor's field of view, they may block a significant portion of area the sensor would otherwise be capable of monitoring. A third constraint which affects sensor wash applications is that the sensor may frequently be located on an area of the vehicle which sees higher levels of contamination than do typical washer nozzle mounting locations, such as on the front grill or the rear lift gate. Washer or dryer nozzles in these locations may be at a higher risk of being clogged by the same material which is obscuring the sensor. There is a need, therefore, for an economical, effective and visually unobtrusive system and method for cleaning and then drying an exterior objective lens or image sensor's exterior surface on a vehicle.

SUMMARY

Accordingly, it is an object of the present disclosure to overcome the above mentioned difficulties by providing an economical, effective and unobtrusive system and method for cleaning and then drying an image sensor's exterior lens surface or a 3-D sensor (e.g., LIDAR) exterior surface to remove accumulated debris (e.g., accumulated dirt, dust, mud, road salt or other built-up debris), and then dry or remove any residual fluid droplets after the cleaning operation is complete.

In accordance with an exemplary embodiment of the present disclosure, an external lens surface washing and drying system has a number of configurations including an aiming fixture configured to (a) spray the image sensor's exterior lens surface or 3-D sensor (e.g., LIDAR) exterior surface to wash away soil or debris and then (b) efficiently generate and aim a fan-shaped stream of drying air at the surface to dry or remove water droplets which remain after washing.

The system and method of the present disclosure comprises a novel low flow air nozzle design which is configured a housing and aimed for drying an image sensor's exterior lens surface or a 3-D sensor (e.g., LIDAR) exterior surface. A shear fan geometry is used but in the present disclosure the shear fan generating nozzle is configured with plural (e.g., first and second) air entrainment inlet ports located near the shear fan generating nozzle assembly's exit orifice. As a result, with entrainment, the shear fan generating nozzle's exit flow rate is much higher than the inlet flow rate and its cleaning/drying efficacy is significantly improved. The output fan also becomes much thicker, which means much larger output coverage. A simple low cost manufacture method of making the nozzle insert from two identical molded parts is also disclosed. The new air dry nozzle geometry is also useful for generating sprays with water, oil or other fluids.

The above and still further objects, features and advantages of the present disclosure will become apparent upon consideration of the following detailed description of a specific embodiment thereof, particularly when taken in conjunction with the accompanying drawings, wherein like reference numerals in the various figures are utilized to designate like components.

DESCRIPTION OF THE PREFERRED EMBODIMENT

Vehicle 2-D or 3-D Imaging System Nomenclature

In order to provide an exemplary context and basic nomenclature, we refer initially to FIGS. 1A-1G, illustrating prior art 2-D and 3-D imaging systems as disclosed in U.S. Pat. No. 7,965,336 (to Bingle et al) and U.S. Pat. No. 9,831,630 (to Lipson). These references are incorporated herein for establishing nomenclature and automotive industry standard terminology, in accordance with the Prior Art.

Figure 1A:
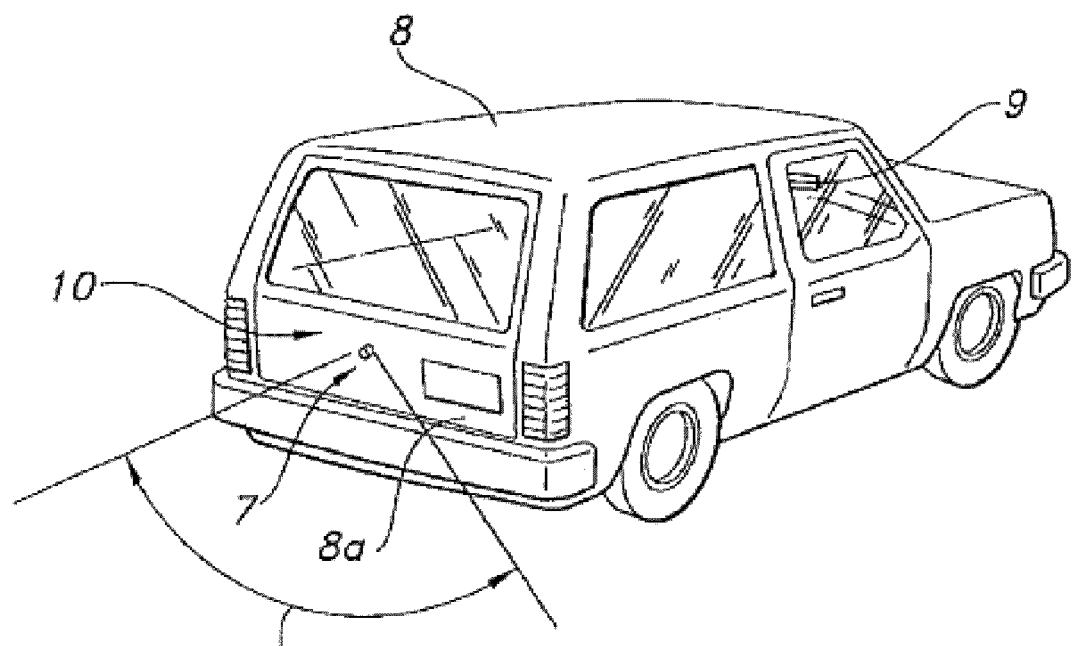
FIG. 1A illustrates a rear perspective view of a vehicle with a back-up camera system as disclosed in U.S. Pat. No. 7,965,336 (to Bingle et al), in accordance with the prior art.
Figure 1B:
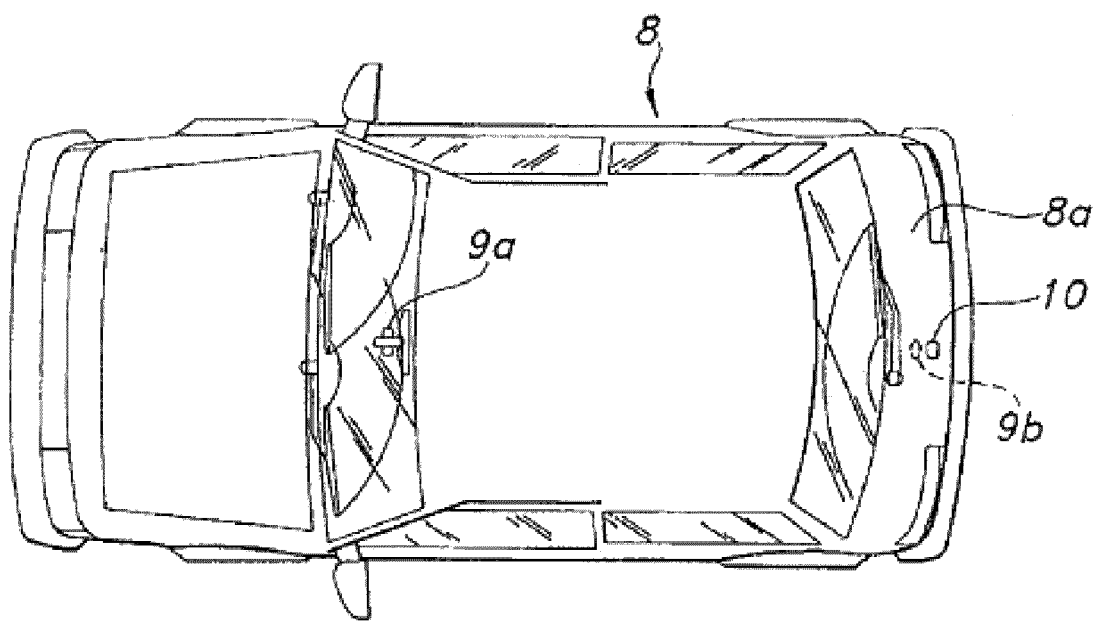
FIG. 1B is a top view of FIG. 1A.

Referring now to FIGS. 1A-1B, a 2-D image capture system or camera system is positioned at a vehicle 8, such as at a rearward exterior portion 8a of the vehicle 8, and is operable to capture an image of a scene occurring interiorly or exteriorly of the vehicle, such as rearwardly of the vehicle, and to display the image at a display or display system 9a of the vehicle which is viewable by a driver or occupant of the vehicle (see, e.g., FIGS. 1A and 1B). The imaging system includes a camera module 10, which is mountable on, at or in the vehicle to receive an image of a scene occurring exteriorly or interiorly of the vehicle, and a control 9b that is operable to process images captured by an image sensor within camera module 10.

Although shown at a rear portion 8a of vehicle 8, camera module 10 may be positioned at any suitable location on vehicle 8, such as within a rear panel or portion of the vehicle, a side panel or portion of the vehicle, a license plate mounting area of the vehicle, an exterior mirror assembly of the vehicle, an interior rearview mirror assembly of the vehicle or any other location where the camera may be positioned and oriented to provide the desired view of the scene occurring exteriorly or interiorly of the vehicle. The image captured by the camera may be displayed at a display screen or the like positioned within the cabin of the vehicle, such as at an interior rearview mirror assembly (such as disclosed in U.S. Pat. No. 6,690,268), or elsewhere at or within the vehicle cabin, such as by using the principles disclosed in U.S. Pat. Nos. 5,550,677; 5,670,935; 5,796,094; 6,097,023 and 6,201,642, and/or 6,717,610.

Figure 1C:
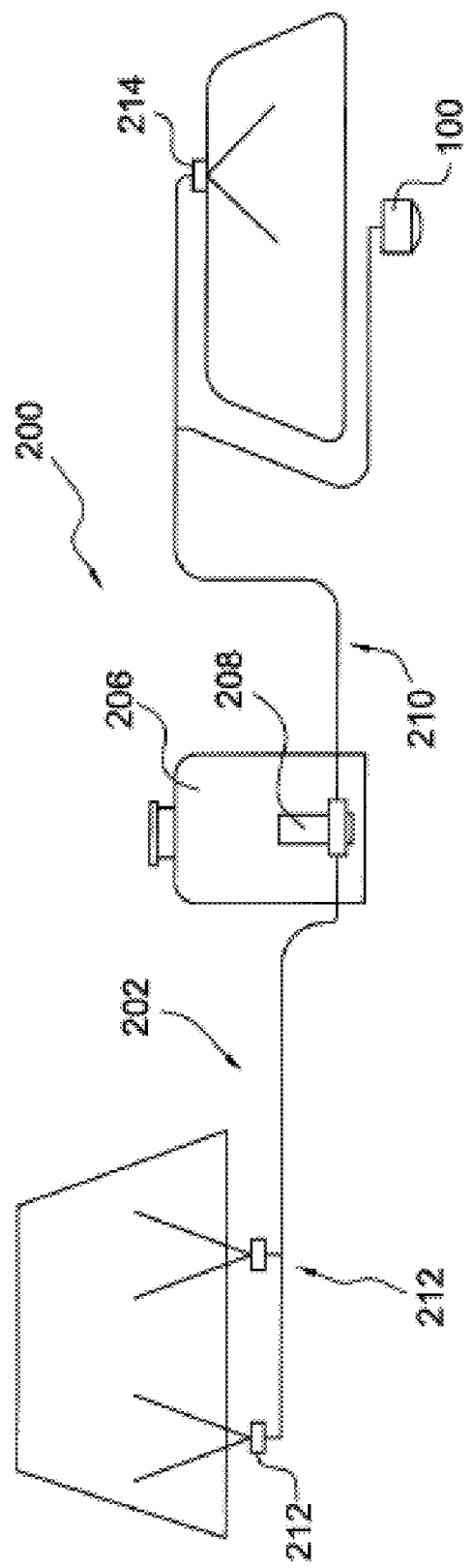
FIG. 1C is schematic diagram illustrating an automotive imaging system with a nozzle assembly configured for cleaning the imaging system's exterior objective lens surface, in accordance with the applicant's prior art.
Figure 1D:
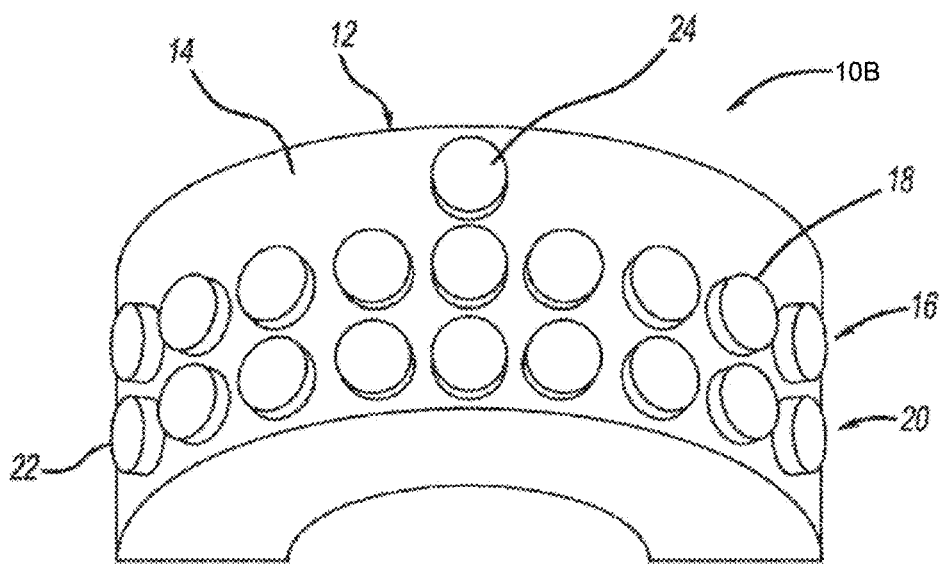
FIG. 1D illustrate a LIDAR 3-D imaging system for use in automotive applications, in accordance with the prior art.
Figure 1E:
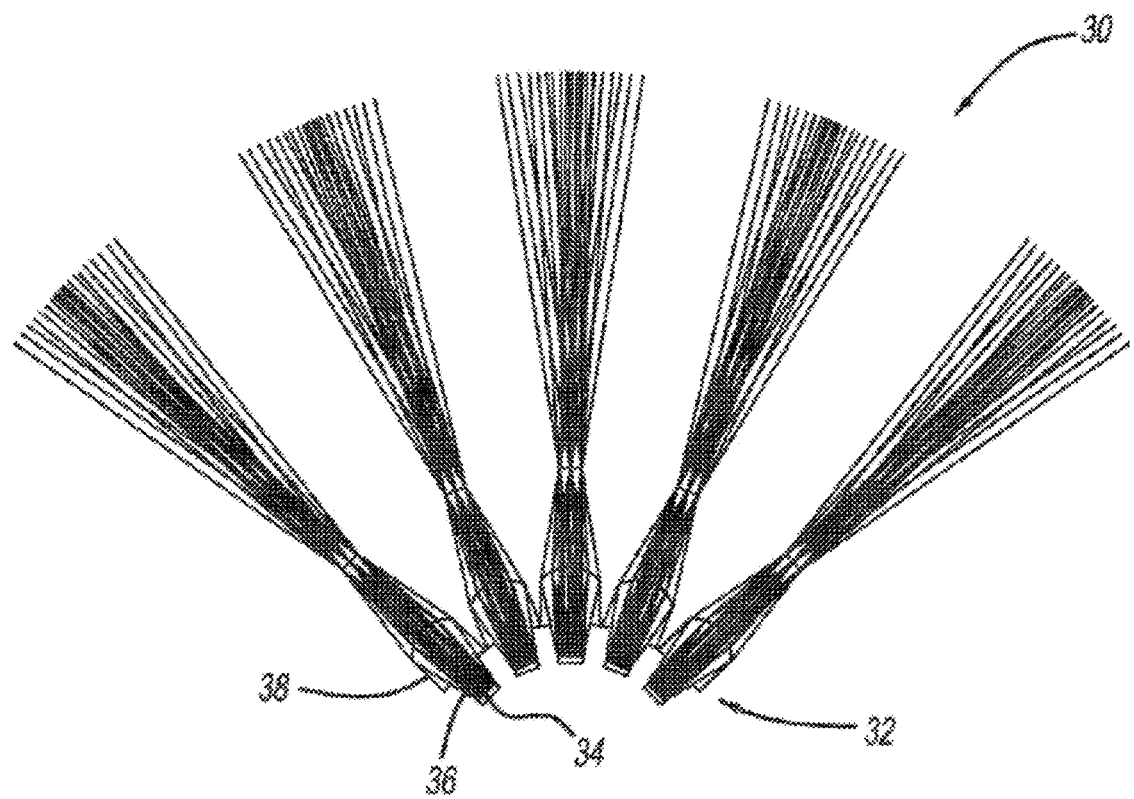
FIG. 1E illustrate a LIDAR 3-D imaging system for use in automotive applications, in accordance with the prior art.
Figure 1F:
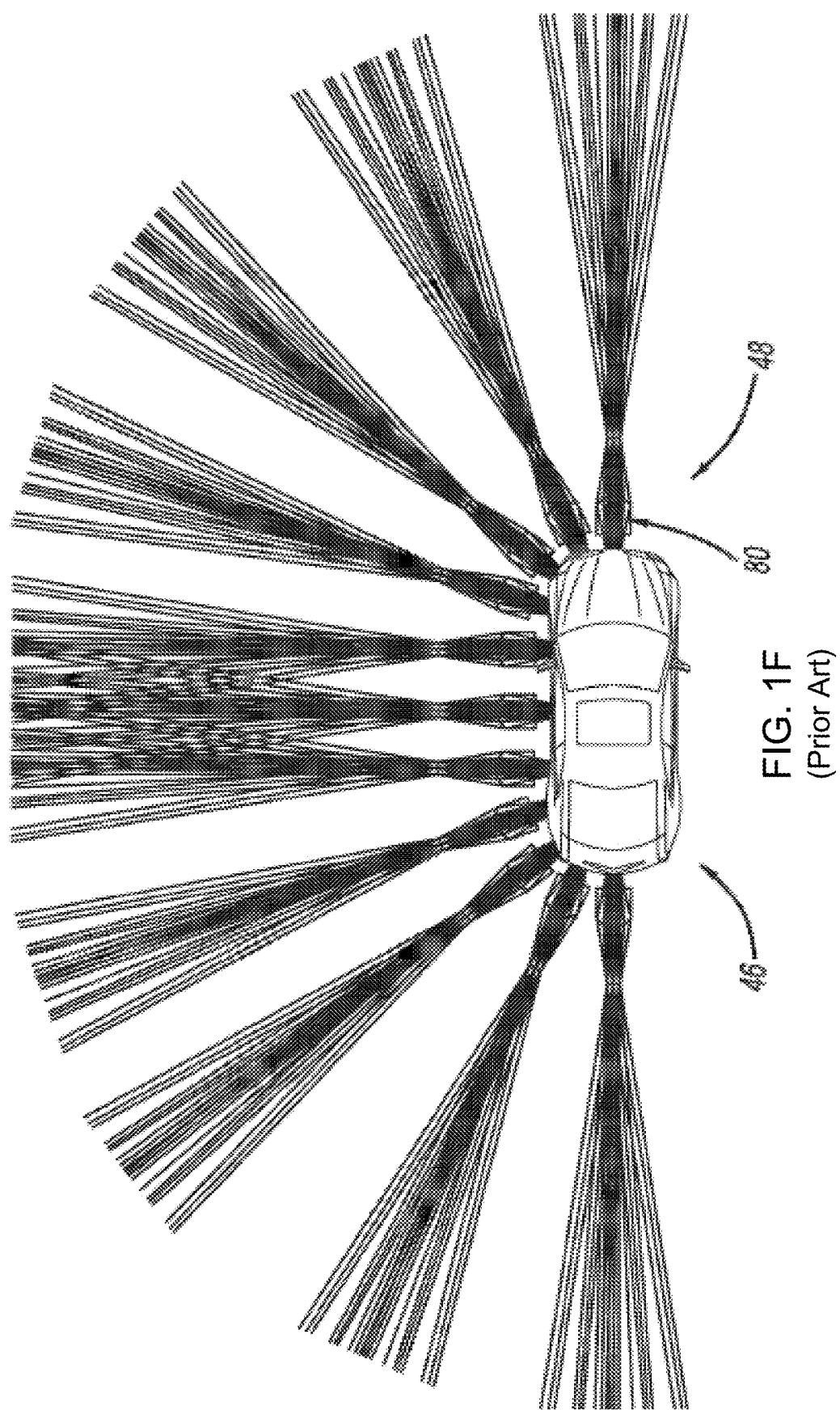
FIG. 1F illustrate a LIDAR 3-D imaging system for use in automotive applications, in accordance with the prior art.
Figure 1G:
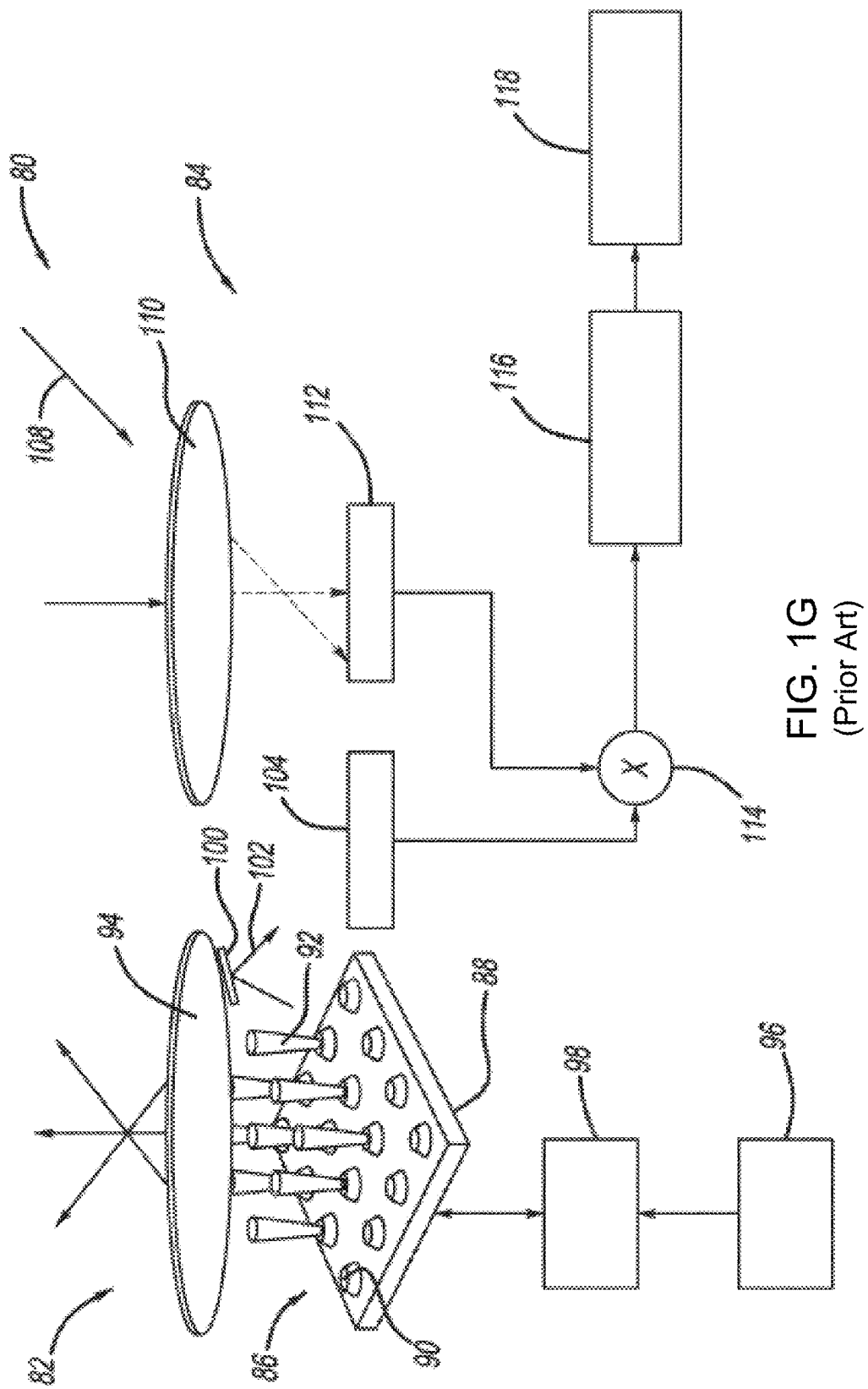
FIG. 1G illustrate a LIDAR 3-D imaging system for use in automotive applications, in accordance with the prior art.

Turning now to the system diagrams of FIG. 1C, the lens washing system is integrated into standard wash fluid pumping equipment already specified for inclusion in many automobiles and other vehicles (e.g., 8). As best seen in FIG. 1C, vehicles (e.g., 8) configured with an existing windshield washing system ("front wash") or rear window washing system ("rear wash") require use of a washing fluid reservoir and pumping system to provide a supply of pressurized washing fluid. Washer tank or reservoir 206 typically includes an internal pump 208 which is activated to draw washing fluid from the reservoir 206 and supply pressurized fluid to a conduit network 210 (e.g., comprising lumens, tubes or hoses) which supply the windshield washing nozzles 212 and rear window washing nozzle(s) 214. In accordance with one embodiment of the present disclosure, the system of the present disclosure actuates external lens washing and drying in response to driver control input or automatically.

Referring next to FIGS. 1D-1G, the system and method of the present disclosure are also well suited for autonomous or semi-autonomous vehicles which use 3-D image generation and object detection systems of the type described and illustrated in U.S. Pat. No. 9,831,630 since they also carry external cover surfaces or objective lens surfaces which are prone to becoming soiled. For example, as shown in FIGS. 1D, 1E, 1F and 1G, LIDAR sensor 10B is readily configured for use in an array 30 in a system 80, several of which are arrayed around the periphery of vehicle 46 and each sensor system includes laser emitters and reflected laser energy receivers which operate through lenses 94, 110.

Integrated Sensor Surface Washing and Drying System

Reference will now be made in detail to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Similar reference numerals are used throughout the figures. Therefore, in certain views, only selected elements are indicated even though the features of the system or assembly may be identical in all of the figures. In the same manner, while a particular aspect of the disclosure is illustrated in these figures, other aspects and arrangements are possible, as will be explained below.

Turning next to FIGS. 2A-6C, external lens surface washing and drying system 500 includes an aiming fixture 510 configured to support and aim an air dry nozzle assembly 512 configured to efficiently generate and aim a fan-shaped stream of drying air 520 which quickly dries or removes water droplets from washer fluid spray nozzle 514 which may remain on an image sensor's exterior lens surface or 3-D sensor (e.g., LIDAR) exterior surface 530 after washing, in accordance with the present disclosure.

Figure 7:
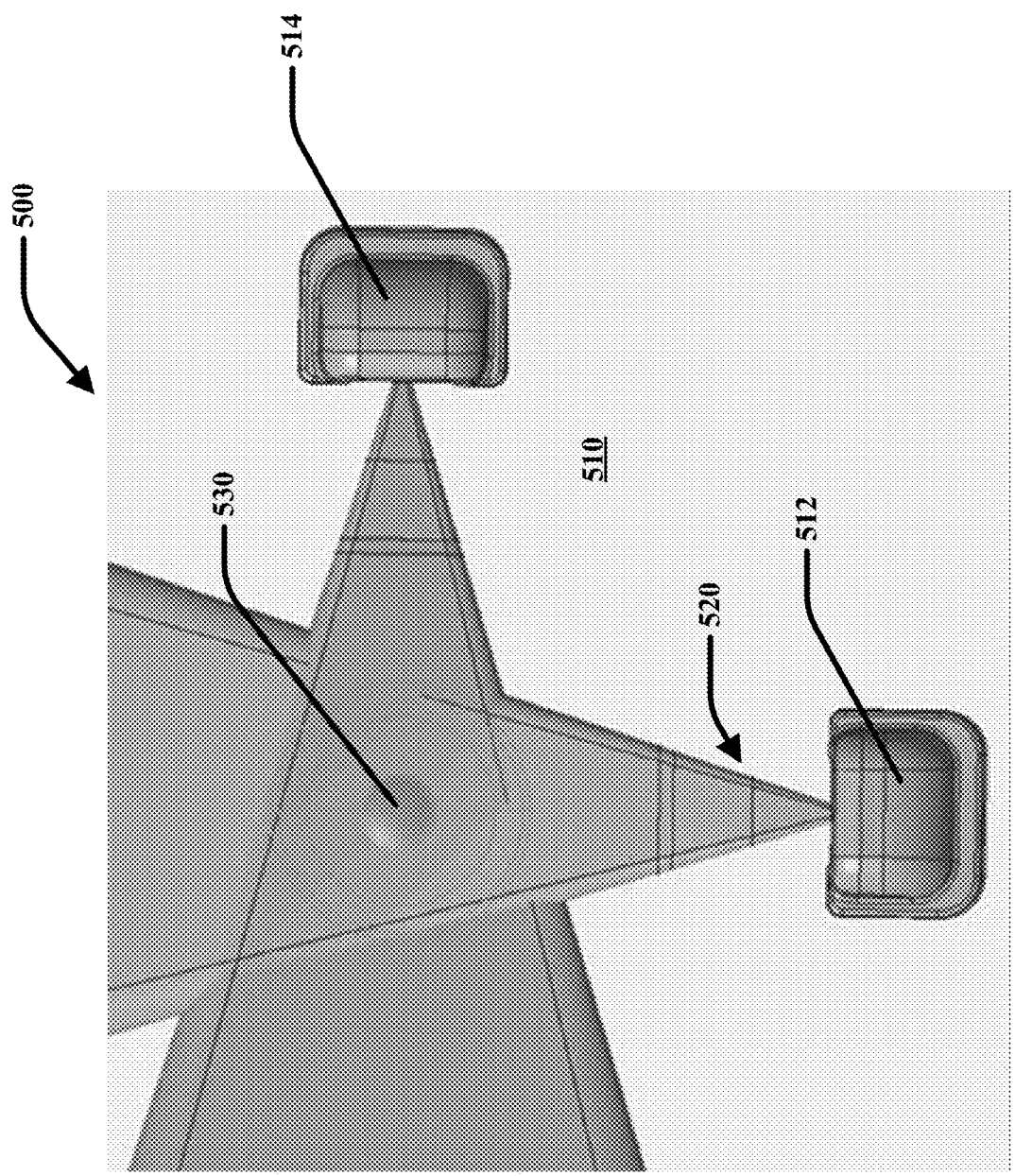
FIG. 7 is an illustration of an embodiment of an external lens surface washing and drying system according to the present disclosure.

As noted above, there are several challenges which must be overcome if, for example, a LIDAR system's external lens surface (FIGS. 3 and 7) is to be washed (or exposed to rain) and then cleared of droplets. If camera washer fluid spray nozzle assembly 514 is used to spray washer fluid to remove dirt or other adherence from lens or sensor surface 530, the air dry nozzle assembly 512 needed for drying or removing those drops needs to provide adequate coverage. The prior art jet nozzles and shear nozzles, as discussed above, provide poor coverage and require an excessive amount of drying air to be expended. It should be noted that although FIGS. 3 and 7 only illustrate one air dry nozzle assembly 512 and one washer fluid spray nozzle assembly 514, there may be a plurality of either one, or both, of 512 and 514 at the same location, or at multiple locations on a vehicle.

As will become clear from the disclosure contained below, the air dry nozzle of the present invention overcomes the problems associated with prior art nozzles by efficiently generating and aiming a powerful narrow fan-shaped stream of drying air 520. The air dry nozzle's efficiency is due partly to the inclusion of entraining air intake ports (e.g., first and second air intake holes 542, 544) located at top and bottom of exit floors to entrain two ambient air flows 552, 554 combined with inlet airflow 518 as it passes through outlet orifice 546. The entrained ambient air flows 552, 554 combine with the processed inlet airflow 518 between the distally projecting members 534, 536 and results in the drying air fan 520. The advantage of this air entrainment is that the output fan 520 becomes thicker and the exit flow rate is much more than inlet flow rate. Therefore the coverage is greatly increased with the same inlet flow conditions (flow rate, dimensions, etc). As a result of the entrained flow rate, the cleaning ability of fan 520 is significantly enhanced over prior art blower nozzles.

Figure 2A:
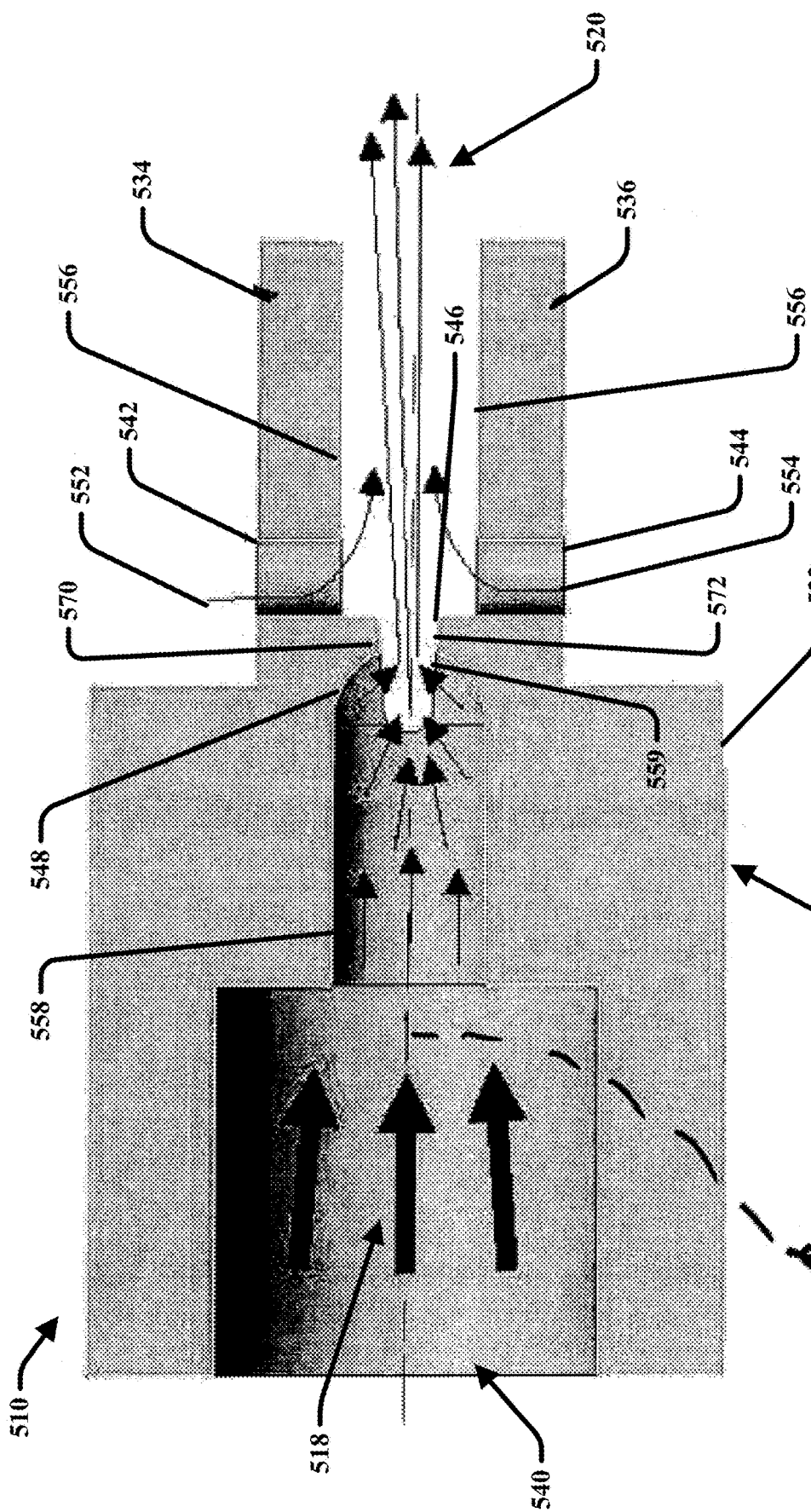
FIG. 2A illustrates a cross sectional view of an air dry nozzle assembly for an external lens surface washing and drying assembly system configured to efficiently generate and aim a fan-shaped stream of drying air at the surface to dry or remove water droplets which may remain on the image sensor's exterior lens surface or 3-D sensor (e.g., LIDAR) exterior surface after washing, in accordance with the present disclosure.
Figure 2B:
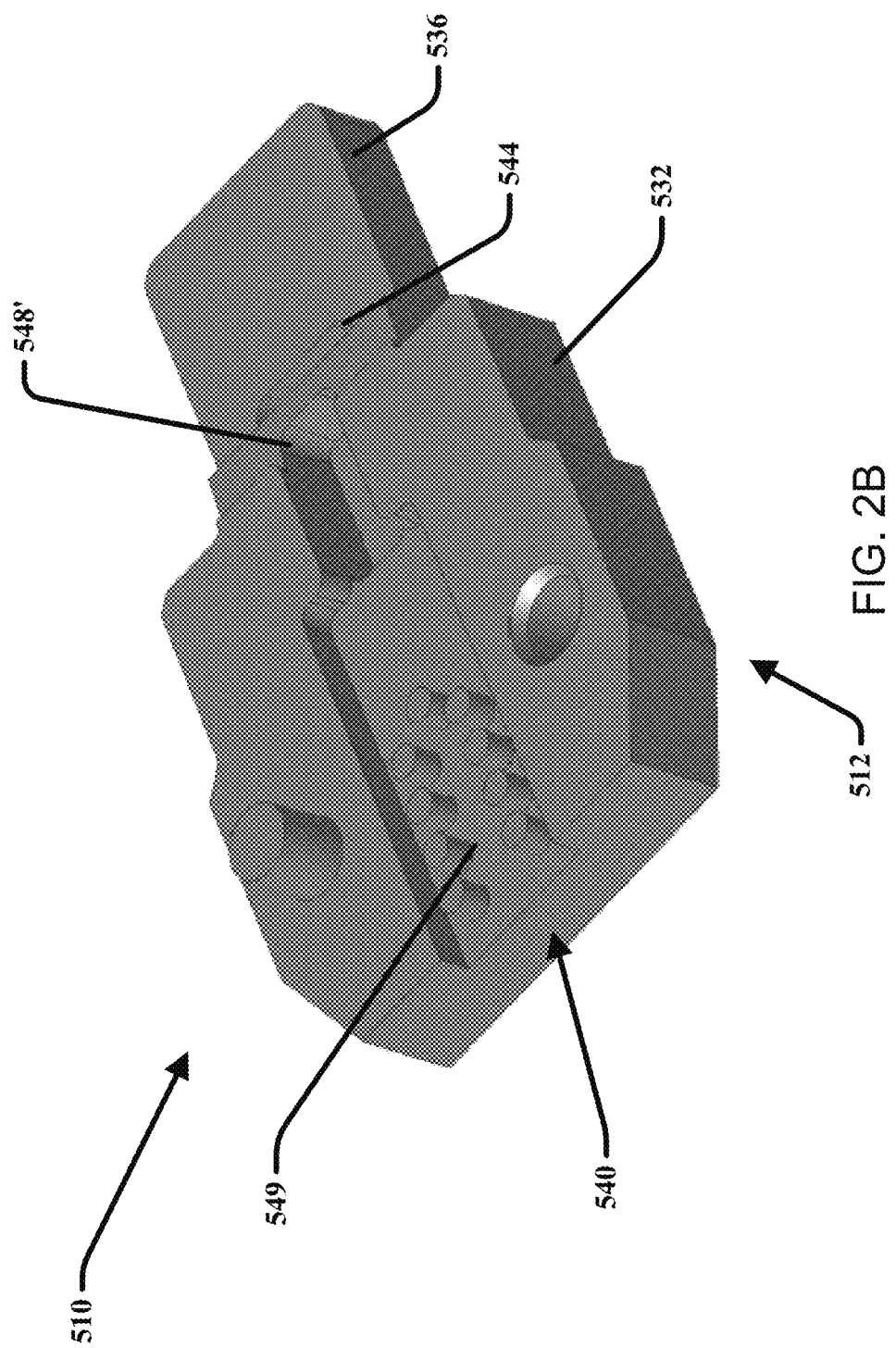
FIG. 2B is a perspective view of an embodiment of an air dry nozzle assembly for an external lens surface washing and drying assembly system in accordance with the present disclosure.
Figure 2C:
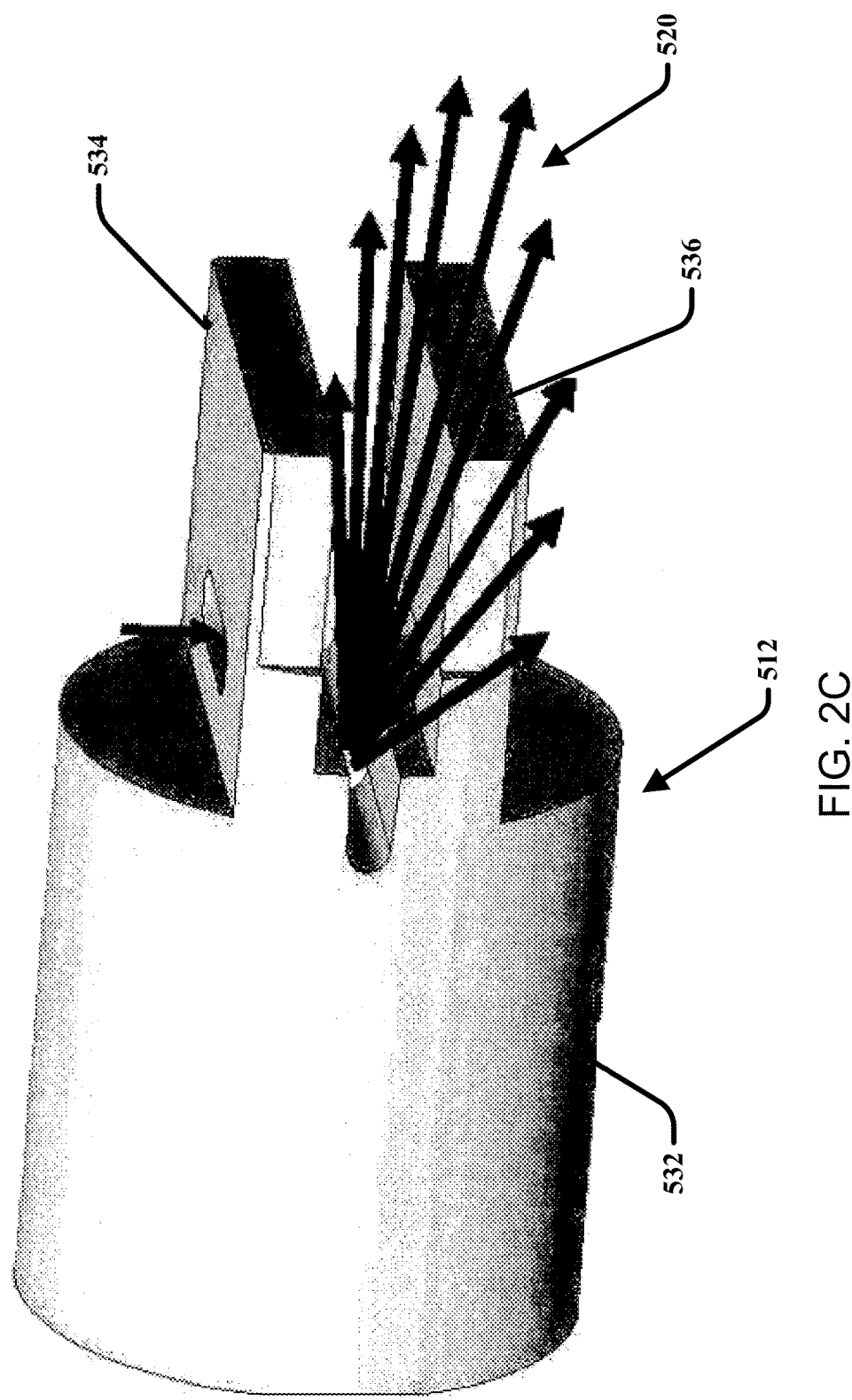
FIG. 2C is a perspective view of an embodiment of an air dry nozzle assembly for an external lens surface washing and drying assembly system in accordance with the present disclosure.
Figure 3:
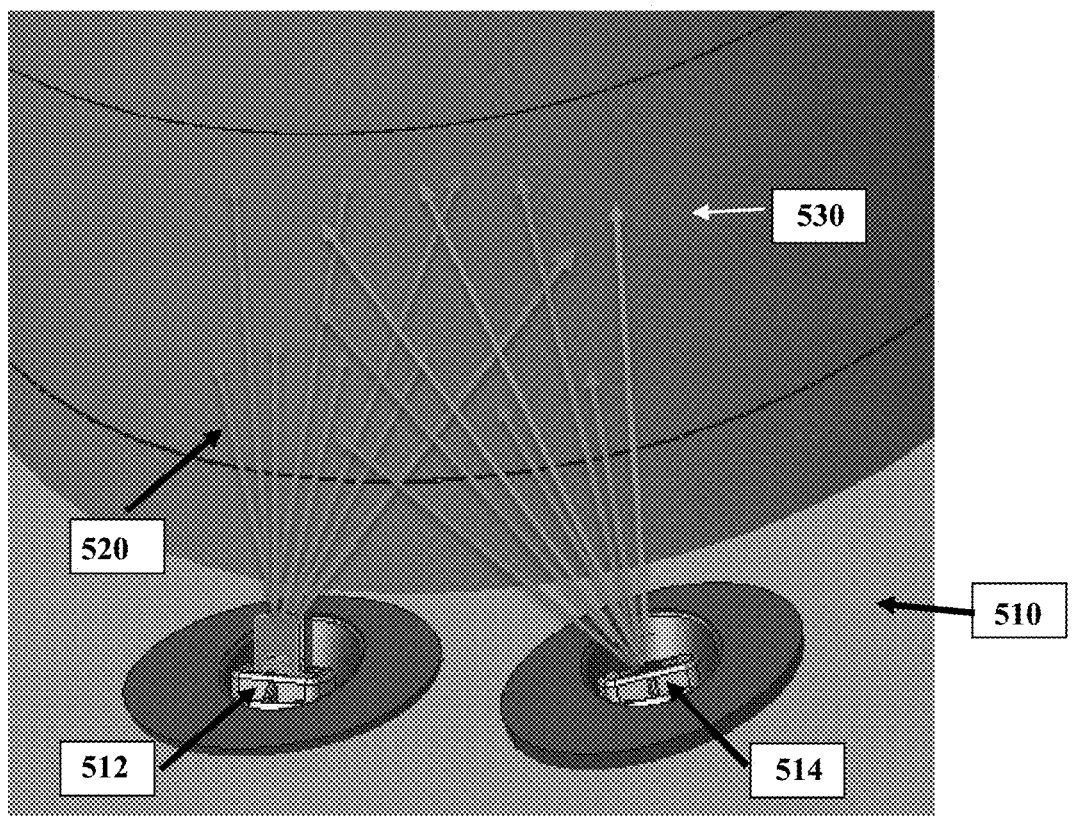
FIG. 3 is a perspective view of an embodiment of external lens surface washing and drying assembly system in accordance with the present disclosure.

The structure and method of the present disclosure provides a new way to increase output coverage of a fan-shaped stream of drying air 520 without changing inlet conditions (flow rate, dimensions, etc). FIG. 2A is a diagram illustrating, in cross section the air dry nozzle assembly 512. The air dry nozzle assembly 512 is contemplated to incorporating entrained air flows to be used for drying a LIDAR lens 530 after a fluid washer cleaning has occurred from a fluid nozzle 514. The drying air output fan 520 may be about 90° wide and about 20° thick (from top to bottom, as seen in FIGS. 2A and 2C). Inlet flow rate may be about 20 L/min at 25 psi at nozzle member inlet 540. As shown in FIG. 2B, entrained ambient intake air flows 552, 554 traverse through top and bottom intake ports 542, 544 of the distally projecting members 534, 536 and are combined with supplied inlet airflow 518 forced distally through a central channel 558 and an outlet orifice or throat 546. The entrained ambient air flows 552, 554 taken in via entrainment inlet ports 542, 544 may amount to about 60% of the inlet flow rate from nozzle member inlet 540. The drying air output fan 520 becomes greatly thicker because of the air entraining effect. Therefore the coverage for a fan-shaped stream or air 520 is much larger with air entrainment.

As shown in FIG. 2A, the air dry nozzle assembly 512 includes a body or a nozzle insert member 532 that may have a cylindrical shape defining a lumen opening or inlet 540 in communication with the central channel 558 which receives supplied inlet airflow 518 (or an equally effective washer fluid removing or drying gas). The body 532 may have various configurations or shapes and this disclosure is not limited herein. The central channel 558 and lumen inlet 540 may be aligned with a central flow axis CL to provide a clear and obstruction free lumen for the air dry nozzle assembly's fluid flow from proximal inlet 540 to the distally located outlet throat or orifice 546. These features may each be defined along the central flow axis CL. The distal portion of nozzle body 532 beyond the outlet throat or orifice 546 defines first and second substantially planar distally projecting members 534, 536 which define opposing substantially planar floor surfaces 556 that direct and aim air forced distally from a throat aperture 546 defined therebetween.

Preferably, the air dry nozzle assembly 512 includes the air dry nozzle insert member or body 532 or multiple insert members 560 (See FIGS. 6A-6C) which may be slidably received within and retained within the aiming fixture 510 or an insert-receiving socket or chamber 550 (See FIGS. 4-6C) and may include an insert receiving opening and a central axis that is aligned along an axis coincident with the central aiming axis for drying air fan 520. The insert receiving socket or chamber 550 may be in fluid communication with the source of pressurized air or drying gas which may flow through the nozzle insert member inlet lumen and distally toward the throat to generate the exhaust flow of drying air or gas 520 to evaporate or move fluid droplets. The insert-receiving socket or chamber 550 defines an insert-receiving conformal and substantially rigid housing having a cavity or socket for receiving and supporting the air dry nozzle insert (e.g., 532, 560), the cavity being configured and aligned to receive and aim an air dry insert or chip member along the center of the drying air fan axis. The chamber 550 may be adjustably inserted within the aiming fixture 510 wherein the angular position of the air dry nozzle assembly 512 may be pivoted or rotated within the aiming fixture 510 as desired.

When in use, inlet airflow 518 from the nozzle member's inlet 540 translates through the channel 558 and through an open slot 559 of the outlet orifice or throat 546. As the inlet airflow 518 exits the open slot 559, it converges with air entrained via entrainment ports 542, 544 distally from and adjacent to the open slot 559. In the embodiment illustrated by FIG. 2A, the throat 546 may include a spherical end exit 548 with an open slot 559 defined therein to assist with distally accelerating inlet airflow 518 from the open slot 559 to be combined with entrained air flows 552, 554 from intake ports 542, 544 to generate a spread sheet of drying air 520 as illustrated in FIG. 2C. In another embodiment illustrated by FIG. 2B, the outlet orifice or throat 546 may include a rectangular end exit 548'. The rectangular end exit 548' may include an exit radius with 5 degree draft that allows for easier manufacturing and alignment of the nozzle insert members 560 of FIG. 6A-6C. Notably, the shape and configuration of the end exit 548 is non limiting.

In both embodiments of FIGS. 2A and 2B, the outlet orifice or throat 546 may include the end exit 548, open slot 559, as well as a first platform surface 570 and a second platform surface 572. These platform surfaces 570, 572 extend from and are aligned distally with the channel 558. The first platform surface 570 may be spaced from the second platform surface 572 and extend generally perpendicularly along the nozzle insert member 532 relative to the central axis CL. The first platform surface 570 and second platform surface 572 may be slightly angled to form a generally v-shaped configuration relative to one another and be aligned with the open slot 559. The platform surfaces 570, 572 may be radially spaced from the inlet ports 542, 544 and planar floor surfaces 556 of the distally projecting members 534, 536, respectively. This configuration may allow entrained air flows 552, 554 to flow through the ports 542, 544 and combine with airflow after being distributed through the open slot 559 and after passing between the platform surfaces 570, 572.

Additionally, the top or first intake port 542 may have an opening that is shaped similar to the bottom or second intake port 544. The first and second intake ports 542, 544 may be generally symmetrically aligned relative to one another and may be aligned and centered relative to the open slot 559. Further, the intake ports 542, 544 may be aligned with and adjacent to the platform surfaces 570, 572. The intake ports 542, 544 may have an elongated shape that includes a width that is greater than the width of the open slot 559 wherein such widths are generally transverse to the central axis CL.

Without the air entrainment, the drying air fan would be a thin sheet. With the air entrainment through the air intake ports (542, 544 as shown in FIG. 2A), the fan-shaped stream of drying air 520 becomes much thicker. The advantage of a thick fan is to provide larger coverage on the cleaning/drying target 530. As noted above, FIG. 3 shows an application of this disclosure in air drying LIDAR lens 530. Further, in accordance with the method of the present disclosure, the washer nozzle 514 sprays washer fluid to clean lens 530, air dry nozzle assembly 512 blows high velocity air with a wide and thick fan 520 to dry or remove any remaining washing fluid droplets. Preferably, both the fluid sprayed for washing from washing nozzle 514 and the drying air fan 520 are aimed at the same target area on lens 530 and have fan widths that may be substantially equal (e.g., >80°). Both fluid and air fan output thickness (meaning the top-to bottom spray thickness) in this application are preferably greater than 20°. In the applicant's prototype development work, a preferred air inlet flow rate is 20 L/min at 25 psi. Air output flow rate may be a surprisingly high and efficacious 32 L/min because of the air entrained from the entrainment inlet ports or air holes 542, 544 located in the distally projecting exit floor members. In applicant's early development tests, no large droplets (e.g., dia.>2 mm) are left on lens surface 530 after 2 seconds of air blowing from that air dry nozzle 512 assembly. Additionally, FIG. 2A illustrates that the floor surfaces 556 of the projecting members 534, 536 have a width which is seen to affect the drying air fan's pattern. The ratio of the width (transverse to the central axis of insert member 532) of each distally projecting member 534, 536 to the width of the open slot 558 width of the outlet orifice or throat 546 (indicated in FIG. 5) is preferably around 3:1 in order to achieve a desired uniform output pattern for the fan-shaped stream of drying air 520.

Figure 4:
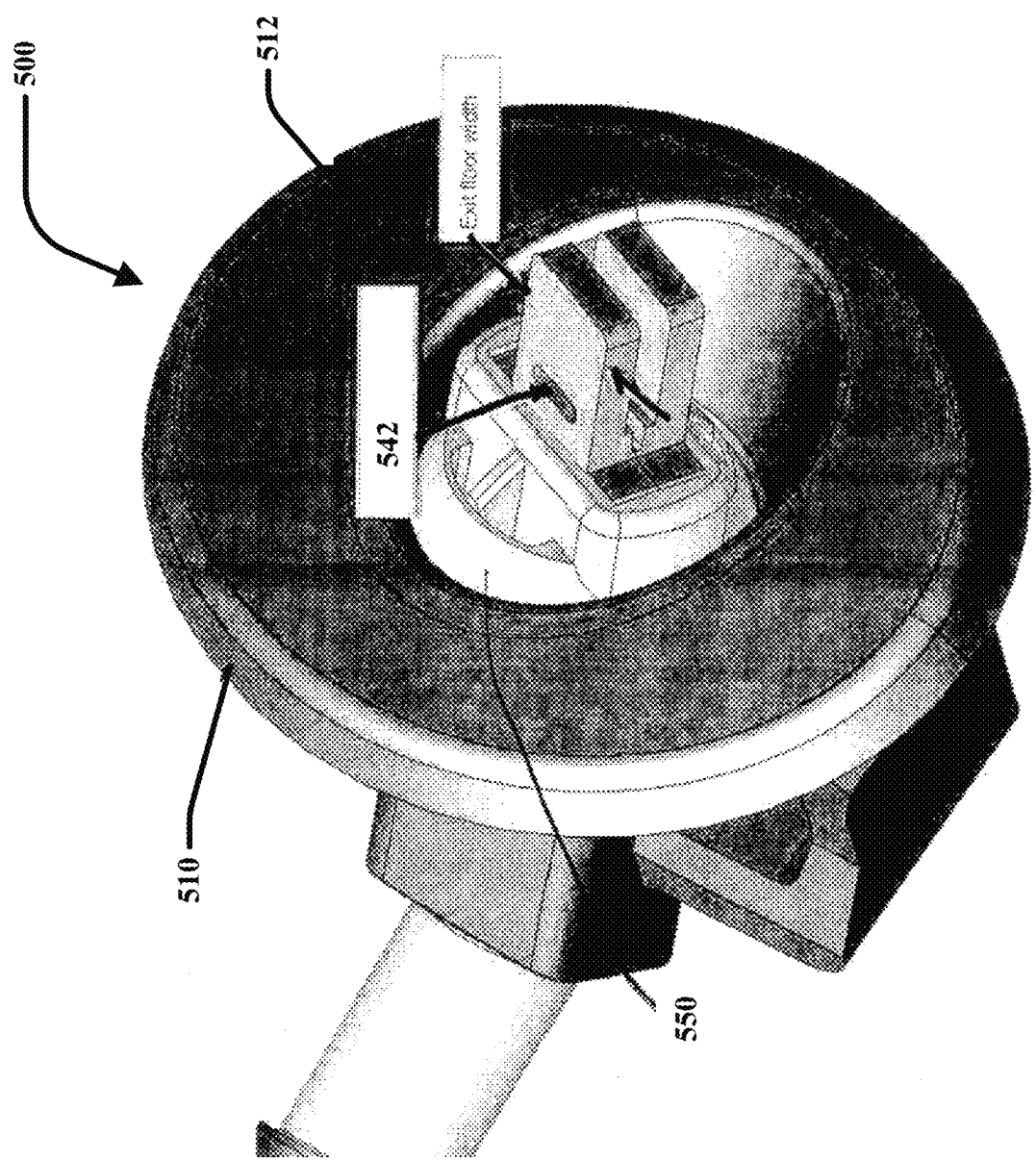
FIG. 4 is a perspective view of an embodiment of an air dry nozzle assembly for an external lens surface washing and drying assembly system in accordance with the present disclosure.
Figure 5:
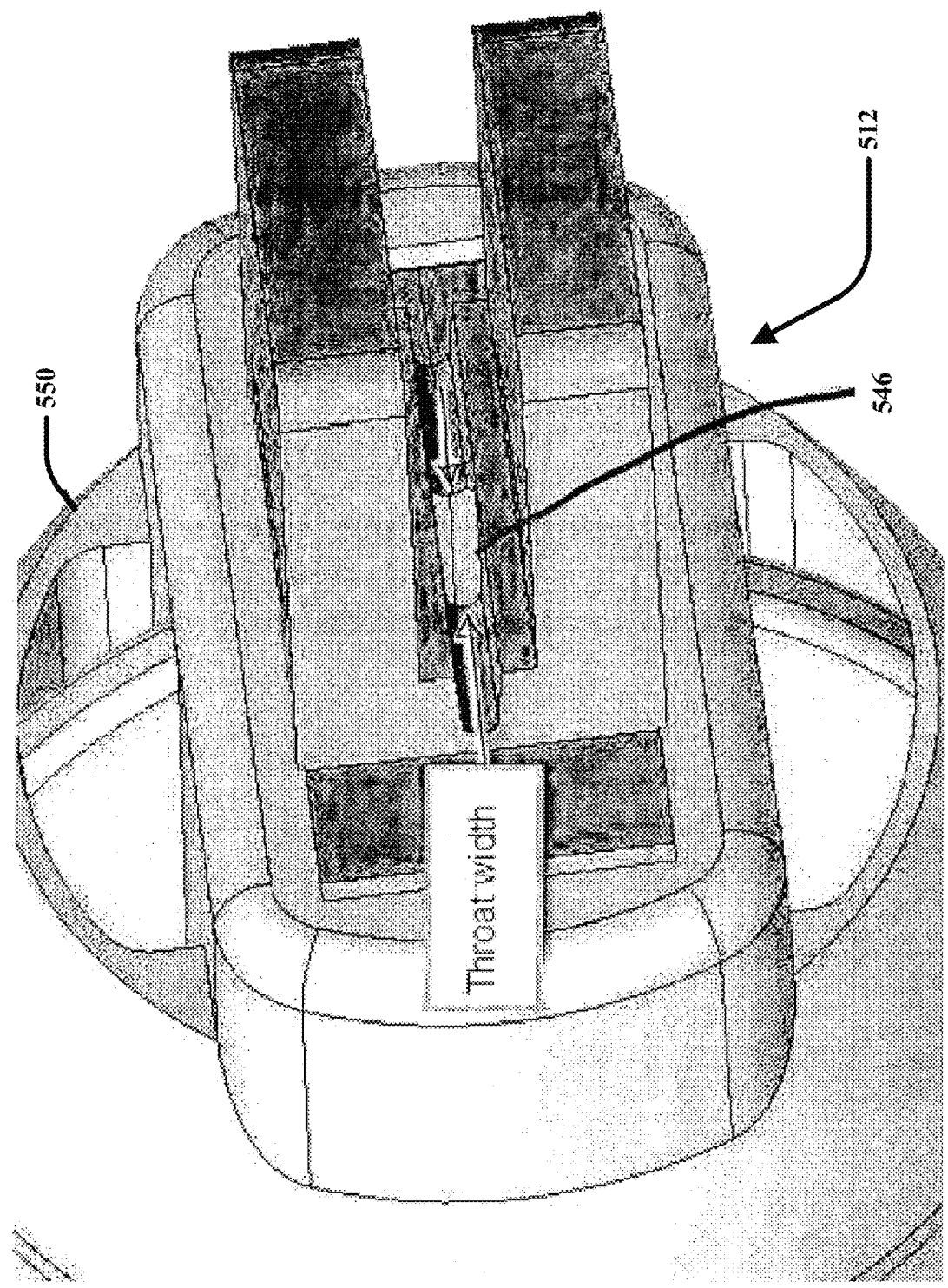
FIG. 5 is a close up perspective view of an embodiment of an air dry nozzle assembly for an external lens surface washing and drying assembly system in accordance with the present disclosure.
Figures 6B, 6C:
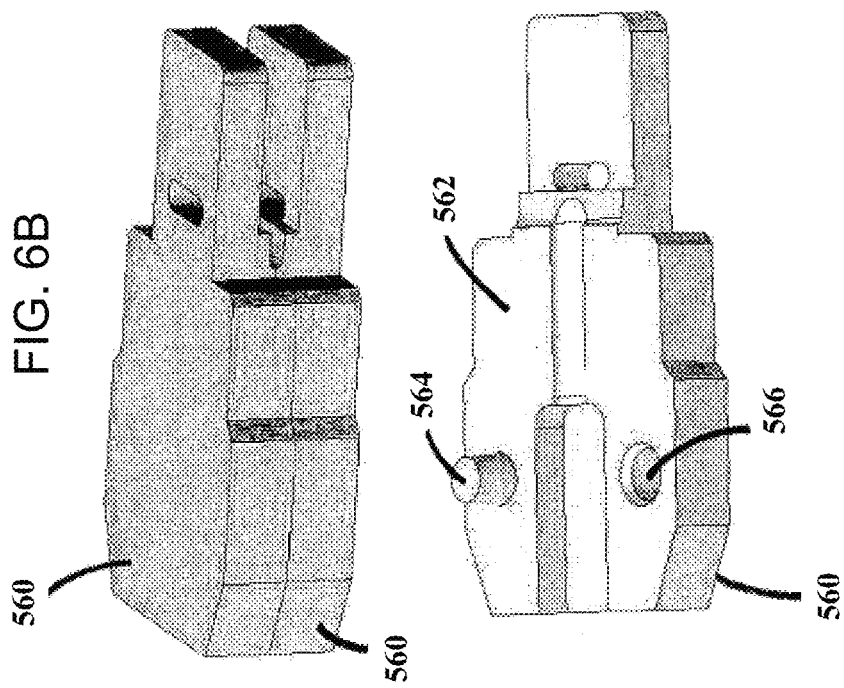
FIG. 6B is a perspective view of nozzle insert members of the aiming fixture of FIG. 6A.
FIG. 6C is a perspective view of a nozzle insert member of the aiming fixture of FIG. 6A.
Figure 6A:
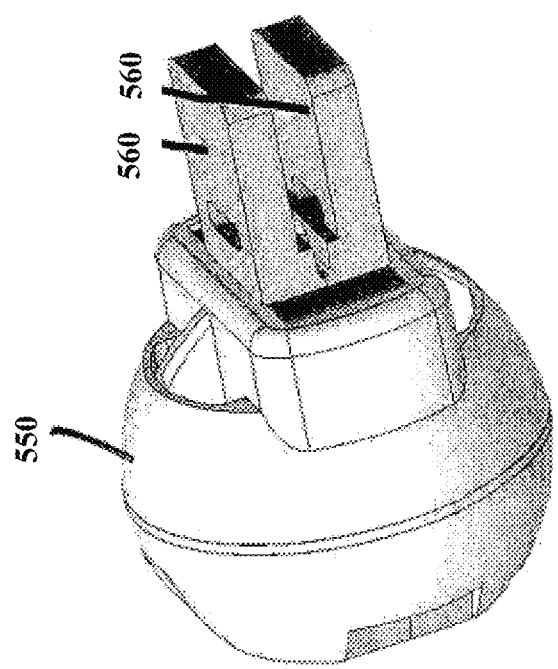
FIG. 6A is a perspective view of an embodiment of the aiming fixture within a housing of the external lens surface washing and drying assembly system in accordance with the present disclosure.

The insert member (e.g., 532) of the air dry nozzle assembly 512 could be molded in one piece as shown in FIG. 2A or may be assembled with multiple pieces as illustrated by FIGS. 6A-6C. The shape of the spherical end exit 548 at the outlet orifice or throat 546 may pose difficult to form due to tooling constraints in manufacturing. As best seen in FIGS. 4 and 5, the throat width may be preferably about 1.2 mm. Any flash at the throat defining the exit or outlet orifice is very likely to adversely affect the output pattern of the fan-shaped stream of drying air 520. FIGS. 6A, 6B and 6C illustrate a surprisingly effective alternative method for molding and manufacturing the air dry nozzle assembly 512 from two halves or nozzle insert half members 560 which may be molded separately and then snapped, fastened, or abutted together before being installed inside and aimed from within said insert-receiving socket or chamber 550 such as a ball or circular shaped housing member. The tooling of this insert part or insert half member 560 is simple to mold and creates no nettlesome parting line flash at the portion which, once assembled, defines the throat 546. Additionally, it is contemplated that additive manufacturing may be implemented to fabricate the air dry nozzle assembly 512 in a single continuous piece (i.e., 532) or with insert half members (i.e., 560).

Referring again to FIGS. 6A, 6B and 6C, one method for making the low cost, robust air dry nozzle assembly 512 comprises: (a) providing first and second identical nozzle members (560, as seen best in FIG. 6C) where each nozzle insert member half 560 defines a channel bearing surface 562 in which is defined the fluid flow inlet 540 and channel 558 trough or groove defined along a flow axis (from inlet to outlet). The channel bearing surface 562 also has a transversely or upwardly projecting alignment pin 564 on a first side of the channel groove with a symmetrically placed alignment pin receiving socket or blind aperture 566 on the opposite side of the channel 558. Each nozzle member 560 may be readily molded without sprue or flashing or other possible defects which might create problems in the assembled nozzle. Next, the first and second identical members 560 are affixed together as shown in FIG. 6B, by aligning and then abutting and fastening, forcing, or bonding each member together. In one embodiment, the nozzle insert members 560 may be symmetrical wherein the alignment pin 564 may be mated with the alignment pin receiving socket 566 such that each insert half's fluid flow channel groove may be aligned with the mating half's groove (defined along the flow axis from inlet to outlet) to provide a clear and obstruction free fluid tight, leak-proof lumen for the two part nozzle insert's channel. While this air dry nozzle geometry (and nozzle assembly 512) has been described principally for use in connection with drying air or other gases, it is also readily adapted for use generating sprays with water, oil or other fluids (i.e., meaning liquids are pumped into the inlet).

As noted above, a key problem to be addressed by the system (e.g., 500) and method of the present disclosure is the paucity of space and the economics of on-vehicle storage of compressed air. Most passenger vehicles do not have compressed air systems and adding a compressed air system (preferably a compressor and an accumulator) is expensive, takes up precious space and adds complexity, but the system of the present disclosure helps minimize the expense and the space requirements, because the air nozzle of the present disclosure (e.g., 512) requires much less than 30 LPM, and the drying air fan 520 is accelerated toward the surface 530 and not rapidly diffused. So, less air is needed. Additionally, the mass and velocity of the air stream in a fan-shaped stream 520 are large enough to overcome the mass of fluid droplets, so the droplets are dried or pushed off the surface 530 and air is distributed to clean a large enough section of sensor surface, without requiring multiple air nozzles. It should be noted that nozzle assembly 512 is not a fluidic generating an oscillating pattern of drying air flow in this prototype embodiment, as the propensity of a fluidic to have an audible oscillation was deemed objectionable.

Requiring large amounts of air might be manageable with single sensors, but new high performance vehicles are starting to have more than one sensor that needs cleaning and drying. In extreme cases, one could expect to need to dry; singly, in zones, or all at once, as many as 30 to 40 sensors, and using the drying systems of the prior art, the amount of air needed is unmanageable. The system of the present disclosure (e.g., 500) can be used very effectively drying multi sensor arrays in zones to allow the system to handle smaller chunks limiting the amount of air needed at any instance, transitioning from one zone to the next. This allows the system of the present disclosure to work effectively (even with LIDAR systems) with 12 to 40V on-board compressors using the zone approach, at the required pressure and flow rates. Preferably the system includes an accumulator and compressor sized such that enough compressed air can be stored to supply the sensor blow off needs, whatever the configuration. In extreme applications such as vehicles with many sensor arrays, multiple automotive compressors could be required to make-up air needed to generate drying air.

The system (e.g., 500) and method of the present disclosure reduces the system level packaging size by entraining additional air at the sensor, thereby reducing the supply requirement from the system and therefore the sizing of every component in that system (e.g., supply tube size, compressor size and accumulator size). In one embodiment, nozzle assembly 512 of the present disclosure can be made by injection molding from any suitable material including, but not limited to, any suitable plastic or polymer material. Alternatively, nozzle assembly 512 could be printed using additive manufacturing such as with a 3D printer from any suitable material including, but not limited to, any suitable plastic or polymer material. Aiming fixture 510 and insert-receiving socket or chamber 550 can be formed from any suitable material such as any metal, metal alloy, plastic or polymer and can be made from molding, casting, injection molding, or 3D printing.

Field of View Considerations

It should be understood that many existing cameras have Field of View Angles from 120 to 170 degrees (e.g., as indicated by radial lines). A major constraint to system functionality is to have nothing intrude into the displayed field of view of the camera, (e.g., 10, 10B) so that the control system or user is not interfered with or distracted by the appearance of the sensor surface washing and drying system 500 or any part thereof. Thus the washing and drying nozzle members (e.g., 512, 514) should be laterally positioned from and yet aimed back at the sensor's FOV. In the illustrated embodiments of the present disclosure, the nozzles (e.g., 512, 514) are oriented and aimed from a fixed location to be away from (e.g., below) the FOV of the sensor. In the embodiment of FIGS. 2A-6C, nozzles of system 500 creates fluid and drying air distributions such that the entirety, or as much as possible, of the sensor surface 530 is covered by washing fluid and drying air which impinge the sensor surface at a selected aim angle.

Having described preferred embodiments of a new and improved assembly, system and method, it is believed that other modifications, variations and changes will be suggested to those skilled in the art in view of the teachings set forth herein. It is therefore to be understood that all such variations, modifications and changes are believed to fall within the scope of the present invention.

Although the present embodiments have been illustrated in the accompanying drawings and described in the foregoing detailed description, it is to be understood that the external lens washing and drying methods and assemblies are not to be limited to just the embodiments disclosed, but that the systems and assemblies described herein are capable of numerous rearrangements, modifications and substitutions. The exemplary embodiment has been described with reference to the preferred embodiments. Obviously, modifications and alterations will occur to others upon reading and understanding the preceding detailed description. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claims.

What is claimed is:

1. A sensor surface cleaning system for cleaning one or more sensor surfaces, comprising:
   an air dry nozzle assembly body that defines an interior lumen that includes an inlet in communication with a channel and an outlet orifice or throat;
   a first distally projecting member that includes a first intake port configured to draw in a first flow of entrained ambient air and a second distally projecting member that includes a second intake port configured to draw in a second flow of entrained ambient air;
   the first distally projecting member and second distally projecting member define opposing substantially planar floor surfaces configured to direct and aim air distally from the outlet orifice or throat; and
   the first and second intake ports are positioned downstream from the outlet orifice or throat;
   wherein said outlet orifice or throat includes an end exit with an open slot that is shaped to assist with accelerating inlet airflow from the open slot to be combined with the first and second flows of entrained ambient air from said first and second intake ports of said first and second distally projecting members;
   the system is configured to generate a fan-shaped stream of drying air from a first flow of supplied air which is used to accelerate at least one flow of entrained ambient air;
   wherein said fan-shaped stream of drying air is aimed at a sensor surface target area having a selected width and a selected height.

2. The sensor surface cleaning system of claim 1, further comprising a washing nozzle assembly configured to generate a fan-shaped spray of washing fluid from a first flow of supplied washing fluid wherein said fan-shaped spray of washing fluid is aimed at said sensor surface target area.

3. The sensor surface cleaning system of claim 2, wherein said fan-shaped stream of washing fluid has a selected spray width and height which are coextensive with said fan-shaped stream of drying air such that both said fan-shaped spray of washing fluid and said fan-shaped stream of drying air are aimed at said sensor surface target area and each cover a selected width and selected height of said target area.

4. The sensor surface cleaning system of claim 1, wherein said air dry nozzle assembly includes a body that is positioned within a housing member and attached to an aiming fixture wherein said housing member is rotatable and pivotable relative to said aiming fixture.

5. The sensor surface cleaning system of claim 1, wherein said air dry nozzle assembly is positioned on an exterior portion of a vehicle.

6. An air nozzle assembly comprising:
   an air dry nozzle assembly body that defines an interior lumen that includes an inlet in communication with a channel and an outlet orifice or throat;
   a first distally projecting member that includes a first intake port configured to draw in a first flow of entrained ambient air and a second distally projecting member that includes a second intake port configured to draw in a second flow of entrained ambient air;
   the first distally projecting member and second distally projecting member define opposing substantially planar floor surfaces configured to direct and aim air distally from the outlet orifice or throat; and
   the first and second intake ports are positioned downstream from the outlet orifice or throat;
   wherein said outlet orifice or throat includes an end exit with an open slot that is shaped to assist with accelerating inlet airflow from the open slot to be combined with the first and second flows of entrained ambient air from said first and second intake ports of said first and second distally projecting members;
   wherein said air dry nozzle assembly is configured to generate a fan-shaped stream of air from a supplied airflow to the inlet combined with the first and second flows of entrained ambient air to generate said fan-shaped stream of air.

7. The air nozzle assembly of claim 6, wherein said air dry nozzle assembly body includes a first nozzle member and a second nozzle member wherein the first nozzle member is abutted to the second nozzle member to define said interior lumen.

8. The air nozzle assembly of claim 7, wherein said first nozzle member is symmetrical with the second nozzle member.

9. The air nozzle assembly of claim 6, wherein said inlet, channel, and outlet orifice are aligned along a common central flow axis.

10. The air nozzle assembly of claim 6, end exit includes at least one of a spherical shape and a rectangular shape.

11. The air nozzle assembly of claim 6 wherein said first and second distally projecting members are generally symmetrical to one another.

12. The air nozzle assembly of claim 6, wherein a first platform surface is spaced from a second platform surface and extend generally perpendicularly relative to a common central flow axis.

13. The air nozzle assembly of claim 12, wherein the first platform surface and the second platform surface form a generally v-shaped configuration and are aligned with the open slot and wherein the first and second platform surfaces are radially spaced from the first and second intake ports.

14. The air nozzle assembly of claim 12, wherein the first intake port includes an opening that is generally symmetrically shaped to an opening of the second intake port wherein both openings are generally aligned relative to one another and aligned adjacent to the open slot.

15. The air nozzle assembly of claim 14, wherein the first and second intake ports are distally aligned with and adjacent to the first and second platform surfaces, respectively.

16. The air nozzle assembly of claim 14, wherein the first and second intake ports have an elongated shape that is greater than the size of the open slot.

* * * * *